United States Patent
Herrmann (10) Patent No.: US 10,562,342 B2
(45) Date of Patent: Feb. 18, 2020

(54) AIRCRAFT WHEEL HUB CAP ATTACHMENT FLANGE STRESS RELIEVING POCKETS

(71) Applicant: Goodrich Corporation, Charlotte, NC (US)

(72) Inventor: Nathaniel John Herrmann, Springfield, OH (US)

(73) Assignee: Goodrich Corporation, Charlotte, NC (US)

( * ) Notice: Subject to any disclaimer, the term of this patent is extended or adjusted under 35 U.S.C. 154(b) by 666 days.

(21) Appl. No.: 15/186,274

(22) Filed: Jun. 17, 2016

(65) Prior Publication Data

US 2017/0361647 A1    Dec. 21, 2017

(51) Int. Cl.

| B64C 25/36 | (2006.01) |
|---|---|
| B60B 7/06 | (2006.01) |
| B60B 3/00 | (2006.01) |
| B60B 3/10 | (2006.01) |
| B60B 7/02 | (2006.01) |
| B60C 23/04 | (2006.01) |
| B60C 29/06 | (2006.01) |

(52) U.S. Cl.
CPC .............. B60B 7/065 (2013.01); B60B 3/004 (2013.01); B60B 7/066 (2013.01); B64C 25/36 (2013.01); *B60B 3/10* (2013.01); *B60B 7/02* (2013.01); *B60B 2900/121* (2013.01); *B60B 2900/3312* (2013.01); *B60C 23/0498* (2013.01); *B60C 29/068* (2013.01); *B60C 2200/02* (2013.01)

(58) Field of Classification Search
CPC ......... B60B 7/065; B60B 23/10; B60B 7/066; B60B 3/004; B64C 25/36

USPC .............................................. 301/9.1, 37.102
See application file for complete search history.

(56) References Cited

U.S. PATENT DOCUMENTS

| 2,490,486 | A | * | 12/1949 | Spurlock | ................... | B60B 3/18 |
|---|---|---|---|---|---|---|
| | | | | | | 301/35.61 |
| 5,408,854 | A | * | 4/1995 | Chiu | ....................... | B60B 37/04 |
| | | | | | | 301/111.02 |
| 5,898,997 | A | | 5/1999 | Meeker et al. | | |
| 7,083,238 | B2 | * | 8/2006 | Clements | ................ | B60B 23/10 |
| | | | | | | 152/396 |
| 7,600,824 | B2 | * | 10/2009 | Dagh | ........................ | B60B 7/04 |
| | | | | | | 301/37.102 |
| 9,897,154 | B2 | * | 2/2018 | Root | .................... | B60B 27/0052 |
| 2003/0080609 | A1 | * | 5/2003 | Darnell | ...................... | B60B 5/02 |
| | | | | | | 301/95.11 |

(Continued)

FOREIGN PATENT DOCUMENTS

| EP | 1918126 | 5/2008 |
|---|---|---|
| EP | 3072707 | 9/2016 |

OTHER PUBLICATIONS

EP Search Report dated Nov. 7, 2017 in EP Application No. 17176345.1.

*Primary Examiner* — Scott A Browne
(74) *Attorney, Agent, or Firm* — Snell & Wilmer, L.L.P.

(57) ABSTRACT

An outboard wheel half has an axis and includes an outboard wheel structure configured to receive at least a portion of a tire. The outboard wheel half also includes a structure defining an alignment hole usable to align a hubcap relative to the structure. The structure defines a pocket circumferentially aligned with the alignment hole to reduce an amount of stress at a location of the alignment hole.

15 Claims, 6 Drawing Sheets

(56) References Cited

U.S. PATENT DOCUMENTS

| | | | |
|---|---|---|---|
| 2004/0032161 A1* | 2/2004 | Smyth | B60B 3/005 |
| | | | 301/9.1 |
| 2006/0087172 A1 | 4/2006 | Rayburn | |
| 2011/0156472 A1* | 6/2011 | Bucheton | B64C 25/405 |
| | | | 301/6.2 |
| 2015/0008759 A1 | 1/2015 | Lamping | |
| 2015/0231936 A1 | 8/2015 | Keller | |

\* cited by examiner

AIRCRAFT WHEEL HUB CAP ATTACHMENT FLANGE STRESS RELIEVING POCKETS

FIELD

The present disclosure relates to aircraft wheel assemblies and, in particular, to features for removing stress of a hubcap attachment flange of an aircraft wheel assembly.

BACKGROUND

Many aircraft include landing gear for supporting the aircraft above a ground surface and for allowing the aircraft to move relative to the ground surface while remaining supported by the ground surface. Each landing gear may include one or more wheel assemblies that may each receive a tire. Each wheel assembly may include a tire pressure monitoring system (TPMS) sensor that may communicate wirelessly with a controller of the aircraft via a TPMS receiver coupled to a hubcap. It may be desirable for the TPMS sensor to be circumferentially aligned with the TPMS receiver. In that regard, alignment holes and alignment pins may be used when attaching the hubcap to the wheel assembly to circumferentially align the TPMS receiver with the TPMS sensor.

SUMMARY

An outboard wheel half, in accordance with various embodiments, has an axis and includes an outboard wheel structure configured to receive at least a portion of a tire. The outboard wheel half also includes a structure defining an alignment hole usable to align a hubcap relative to the structure. The structure defines a pocket circumferentially aligned with the alignment hole.

In any of the foregoing outboard wheel halves, the structure further defines a plurality of pockets that includes the pocket, the plurality of pockets being circumferentially positioned about the structure.

In any of the foregoing outboard wheel halves, the plurality of pockets are spaced equidistant about a circumference of the structure.

In any of the foregoing outboard wheel halves, the alignment hole is positioned circumferentially between the pocket and a second pocket.

In any of the foregoing outboard wheel halves, the outboard wheel half is configured to mate with an inboard wheel half to form a wheel assembly for use with landing gear of an aircraft.

In any of the foregoing outboard wheel halves, the structure includes a hubcap attachment flange that includes a first ring retaining tab and a second ring retaining tab such that the pocket is positioned circumferentially between the first ring retaining tab and the second ring retaining tab.

In any of the foregoing outboard wheel halves, the alignment hole is defined by one of the first ring retaining tab or the second ring retaining tab.

In any of the foregoing outboard wheel halves, the first ring retaining tab or the second ring retaining tab are configured to resist movement of a bearing retaining ring relative to the outboard wheel half during installation of the outboard wheel half on an aircraft axle.

In any of the foregoing outboard wheel halves, a ratio of a circumferential distance of the pocket to a circumferential distance of the first ring retaining tab or the second ring retaining tab is at least 1 to 1.

A wheel assembly for using in landing gear of an aircraft, in accordance with various embodiments, includes a wheel structure configured to receive at least a portion of a tire. The wheel assembly also includes a structure defining an alignment hole usable to align a hubcap relative to the structure. The structure defines a pocket circumferentially aligned with the alignment hole.

In any of the foregoing wheel assemblies, the structure includes a plurality of pockets that includes the pocket, the plurality of pockets being circumferentially positioned about the structure.

In any of the foregoing wheel assemblies, the plurality of pockets are spaced equidistant about a circumference of the structure.

In any of the foregoing wheel assemblies, the alignment hole is positioned circumferentially between the pocket and a second pocket.

In any of the foregoing wheel assemblies, the structure includes a hubcap attachment flange that includes a first ring retaining tab and a second ring retaining tab such that the pocket is positioned circumferentially between the first ring retaining tab and the second ring retaining tab.

In any of the foregoing wheel assemblies, the alignment hole is defined by one of the first ring retaining tab or the second ring retaining tab.

In any of the foregoing wheel assemblies, the first ring retaining tab or the second ring retaining tab are configured to resist movement of a bearing retaining ring relative to the wheel assembly during installation of the wheel assembly on an aircraft axle.

In any of the foregoing wheel assemblies, a ratio of a circumferential distance of the at least one pocket to a circumferential distance of the first ring retaining tab or the second ring retaining tab is at least 1 to 1.

A wheeled vehicle includes a first wheel assembly and a second wheel assembly. The second wheel assembly includes a wheel structure configured to receive at least a portion of a tire. The second wheel assembly also includes a hubcap attachment flange defining an alignment hole usable to align a hubcap relative to the hubcap attachment flange and defining a pocket circumferentially aligned with the alignment hole.

In any of the foregoing wheeled vehicles, the hubcap attachment flange includes a first ring retaining tab and a second ring retaining tab such that the pocket is positioned circumferentially between the first ring retaining tab and the second ring retaining tab.

In any of the foregoing wheeled vehicles, a ratio of a circumferential distance of the pocket to a circumferential distance of the first ring retaining tab or the second ring retaining tab is at least 1 to 1.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
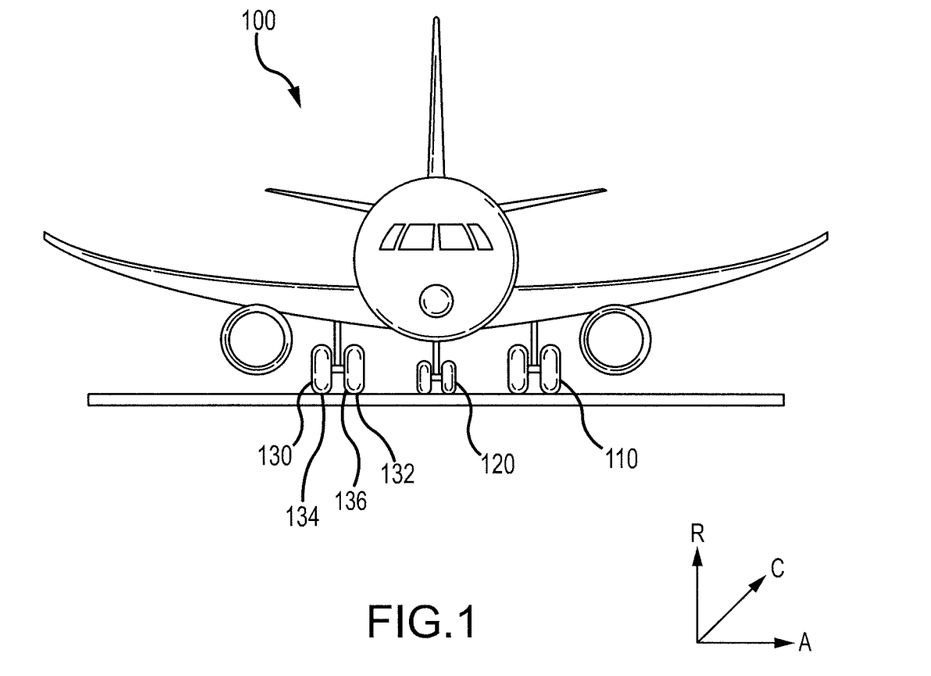
FIG. 1 is a drawing illustrating an aircraft having multiple landing gear, in accordance with various embodiments.

Referring now to FIG. 1, an aircraft 100 in accordance with various embodiments can include multiple landing gear including a first landing gear 110, a second landing gear 120 and a third landing gear 130. Each landing gear may include one or more wheel assemblies. For example, third landing gear 130 includes an inner wheel assembly 132 and an outer wheel assembly 134. Each wheel assembly of the aircraft 100 may be designed to receive a tire. For example, a tire 136 may be placed about an outer circumference of inner wheel assembly 132 and inflated. An A-R-C axis is shown in various drawings to illustrate the axial, radial and circumferential directions relative to inner wheel assembly 132. The A, or axial, direction corresponds to an axis of rotation of inner wheel assembly 132. The R, or radial, direction corresponds to a direction of a radius of inner wheel assembly 132. The C, or circumferential, direction corresponds to a direction of the circumference of inner wheel assembly 132.

Figure 2:
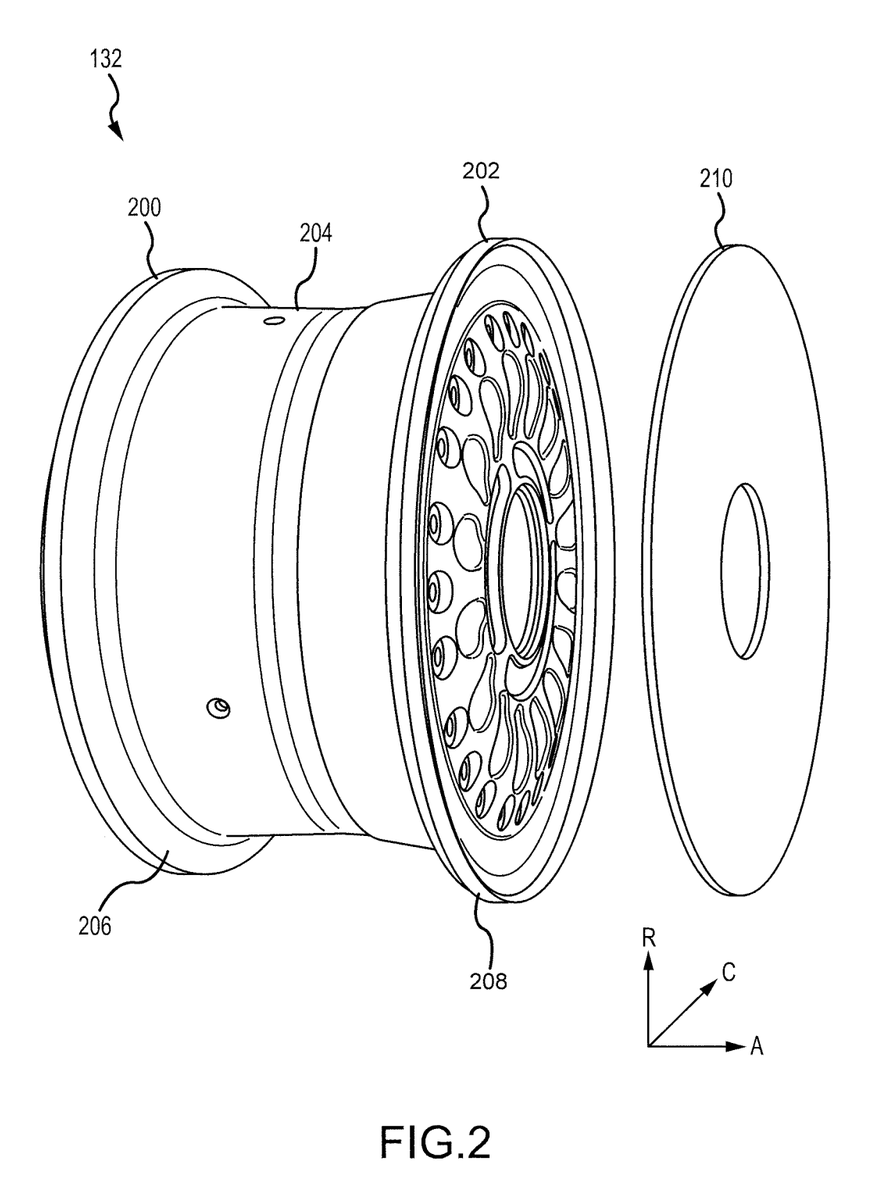
FIG. 2 is a drawing illustrating a wheel assembly of an aircraft landing gear, in accordance with various embodiments.

Turning to FIG. 2, inner wheel assembly 132 includes an inboard wheel half 200 and an outboard wheel half 202. Although inner wheel assembly 132 is utilized in an aircraft, one skilled in the art will realize that a similar wheel assembly may be used in other vehicles such as cars or motorcycles. Inner wheel assembly 132 also includes a wheel structure 204. Wheel structure 204 includes structure for receiving a tire and forming a seal with the tire to allow pressurized air to inflate the tire. Wheel structure 204 includes an inboard wheel structure 206 of inboard wheel half 200 and an outboard wheel structure 208 of outboard wheel half 202. In various embodiments, outboard wheel half 202 may be designed to be coupled to a hubcap 210.

Figure 3:
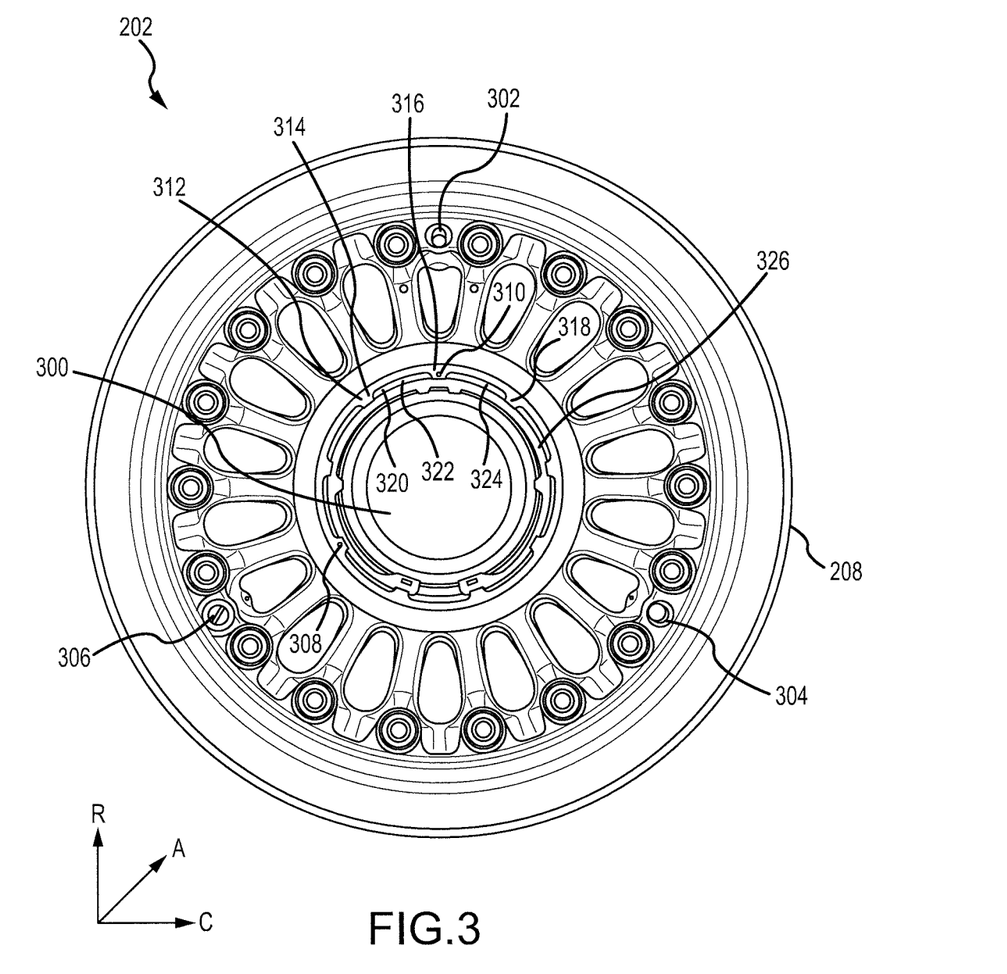
FIG. 3 is a drawing illustrating an outboard wheel half of the wheel assembly of FIG. 2, in accordance with various embodiments.

Turning to FIG. 3, an axial view of outboard wheel half 202 illustrates various features of outboard wheel half 202. In particular, outboard wheel half 202 includes a hubcap attachment flange 300. With brief reference to FIGS. 2 and 3, hubcap 210 may be coupled to outboard wheel half 202 via hubcap attachment flange 300.

As discussed above and with reference to FIGS. 1 and 3, outboard wheel half 202 is designed to receive tire 136. In that regard, outboard wheel half 202 may include an inflation valve 302. Tire 136 may be inflated or deflated via inflation valve 302. Outboard wheel half 202 may also include an over inflation valve 304. Over inflation valve 304 may reduce the likelihood of over inflation of tire 136. For example, over inflation valve 304 may open to release air if pressure within tire 136 is equal to or greater than a tire pressure maximum threshold value.

Returning reference to FIGS. 2 and 3, outboard wheel half 202 may also include a tire pressure monitor system (TPMS) port 306 configured to receive a TPMS sensor. The TPMS sensor may detect a tire pressure of tire 136 and may transmit the detected tire pressure to one or more systems of aircraft 100. In particular, the TPMS sensor may transmit tire pressure data to a TPMS receiver coupled to hubcap 210. It is desirable for hubcap 210 to be circumferentially aligned in such a way that the TPMS sensor and the TPMS receiver are circumferentially aligned with each other such that data may wirelessly propagate from the TPMS sensor to the TPMS receiver with a low amount of interference.

In order to circumferentially align hubcap 210 and outboard wheel half 202, a structure of outboard wheel half 202 may define at least one alignment hole. As shown, the structure is the hubcap attachment flange 300 and it defines a first alignment hole 308 and a second alignment hole 310. As shown in FIG. 3, first alignment hole 308 and second alignment hole 310 are separated by 240 degrees (240°). In various embodiments, first alignment hole 308 and second alignment hole 310 may be separated by any distance other than 180° to facilitate alignment of hubcap 210 relative to outboard wheel half 202.

Hubcap 210 may include a first alignment pin and a second alignment pin. In order to circumferentially align hubcap 210 with outboard wheel half 202, the first alignment pin may be aligned with and received by first alignment hole 308 and the second alignment pin may be aligned with and received by second alignment hole 310. In response to first alignment pin being received by first alignment hole 308 and second alignment pin being received by second alignment hole 310, hubcap 210 is circumferentially aligned with outboard wheel half 202 in the desired orientation.

Hubcap attachment flange 300 may include at least one ring retaining tab 312 including a first ring retaining tab 314, a second ring retaining tab 316, and a third ring retaining tab 318. Hubcap attachment flange 300 may also include at least one pocket 320 including a first pocket 322 and a second pocket 324. Ring retaining tabs 312 and pockets 320 may be positioned in an alternating fashion circumferentially about hubcap attachment flange 300. For example, first pocket 322 may be circumferentially surrounded by first ring retaining tab 314 and second ring retaining tab 316. Similarly, second ring retaining tab 316 may be circumferentially surrounded by first pocket 322 and second pocket 324. Pockets 324 may be positioned equidistant about a circumference of hubcap attachment flange.

Inclusion of pockets 320 in hubcap attachment flange 300 tends to divert load, thereby reducing stresses exerted on hubcap attachment flange 300 at locations adjacent first alignment hole 308 and second alignment hole 310.

Ring retaining tabs 312 may support a bearing retaining ring 326 and may resist separation of bearing retaining ring 326 from outboard wheel half 202.

Alignment holes 308, 310 may be defined by ring retaining tabs 312. For example, second alignment hole 310 may be defined by second ring retaining tab 316.

Figure 4:
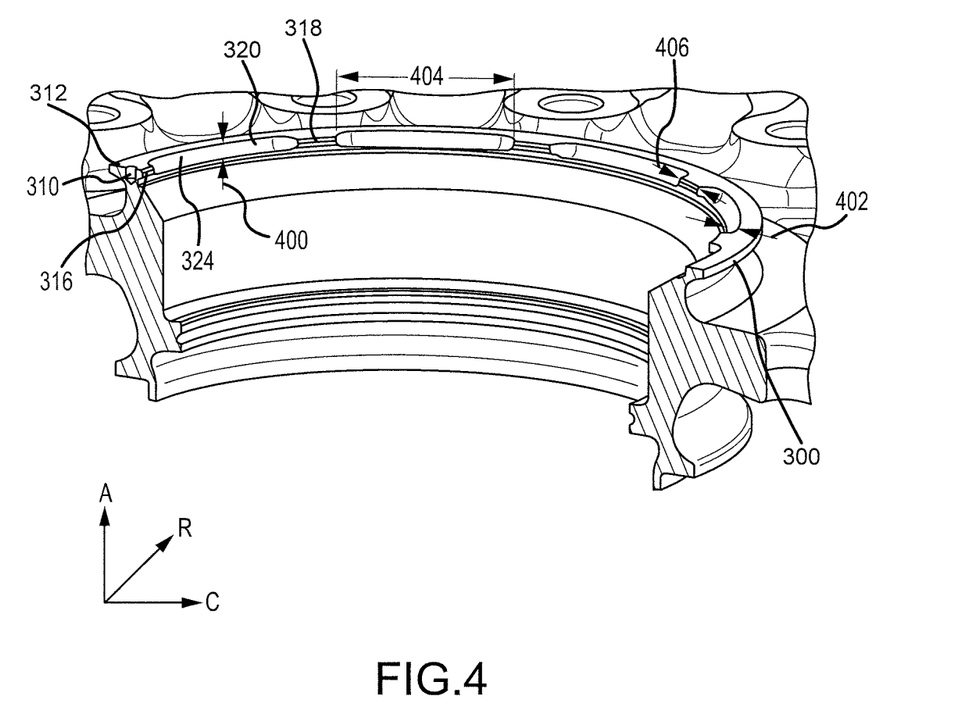
FIG. 4 is a drawing illustrating a radial view of a portion of the outboard wheel half of FIG. 3, in accordance with various embodiments.

Turning now to FIG. 4, a cross-sectional view of a portion of hubcap attachment flange 300 illustrates various features of ring retaining tabs 312 and pockets 320. As shown in FIG. 4, second pocket 324 is defined by a curved, concave surface of hubcap attachment flange 300. In various embodiments, second pocket 324 may be defined by a surface of hubcap attachment flange 300 having any other shape, such as a surface having one or more right angles.

In various embodiments, pockets 320 may be defined as an absence of material circumferentially aligned with ring retaining tabs. In that regard, ring retaining tabs 312 and pockets 320 may have similar dimensions in the axial and radial directions. For example, ring retaining tabs 312 and pockets 320 may have an axial distance 400 and a radial distance 402. Axial distance 400 and radial distance 402 may be the same or different. In various embodiments, axial distance 400 may be between 0.1 inch and 2 inches (2.54 millimeters (mm) and 50.8 mm) or between 0.25 inches and 1 inch (6.35 mm and 25.4 mm) or between 0.25 inches and 0.75 inches (6.35 mm and 19.05 mm). In various embodiments, radial distance 402 may be between 0.1 inch and 2 inches (2.54 millimeters (mm) and 50.8 mm) or between 0.25 inches and 1 inch (6.35 mm and 25.4 mm) or between 0.25 inches and 0.75 inches (6.35 mm and 19.05 mm).

Pockets 320 may have a circumferential distance 404 and ring retaining tabs 312 may have a circumferential distance 406. In various embodiments, a ratio of circumferential distance 404 to circumferential distance 406 may be at least 1 to 1 (1:1). In various embodiments, the ratio of circumferential distance 404 to circumferential distance 406 may be between 1:1 and 10:1, between 2:1 and 8:1, between 2:1 and 5:1, or the like.

Figure 5:
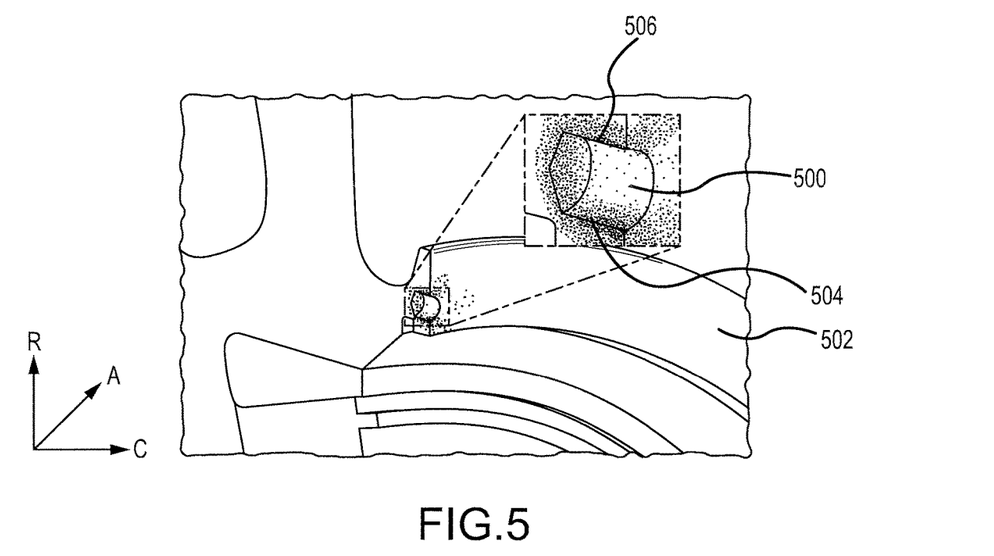
FIG. 5 is a diagram illustrating stresses experienced by a hubcap attachment that does not include pockets.
Figure 6:
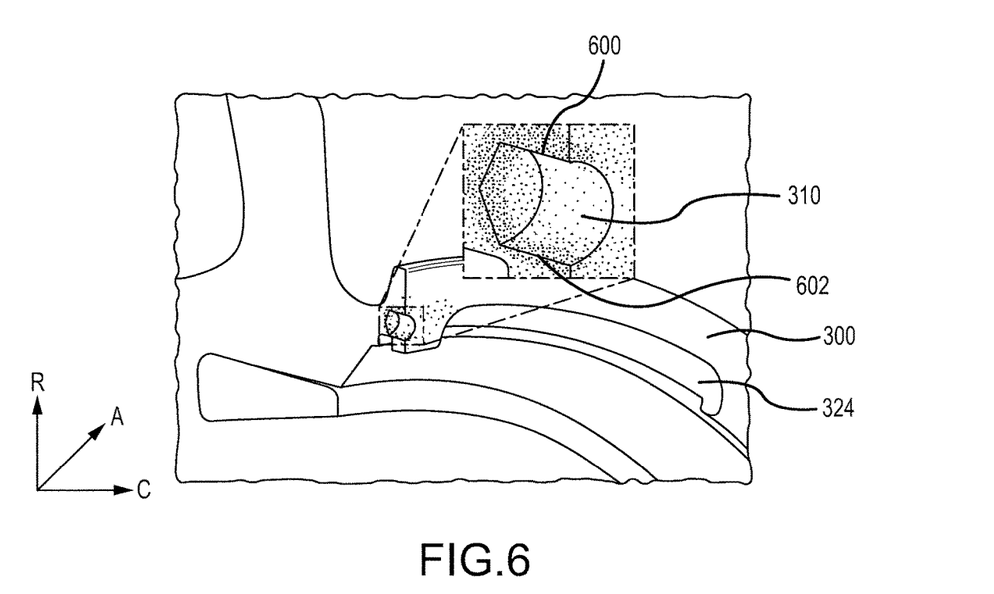
FIG. 6 is a diagram illustrating stresses experienced by a hubcap attachment flange of the outboard wheel half of FIG. 3, in accordance with various embodiments.

Turning to FIG. 5, a diagram illustrates stresses experienced by an alignment hole 500 of a hubcap attachment flange 502 that does not include pockets. Turning to FIG. 6, a diagram illustrates stresses experienced by second alignment hole 310 of hubcap attachment flange 300 that includes second pocket 324. Referring now to FIGS. 5 and 6, a radially outward end 506 and a radially inward end 504 of alignment hole 500 experiences greater stresses (i.e., an increased stress concentration) than a radially outward end 600 and a radially inward end 602 of second alignment hole 310. The difference in stresses experienced by hubcap attachment flange 502 and hubcap attachment flange 300 illustrates the diversion in load and corresponding reduction in stress that is provided by inclusion of second pocket 324 in hubcap attachment flange 300.

Figure 7:
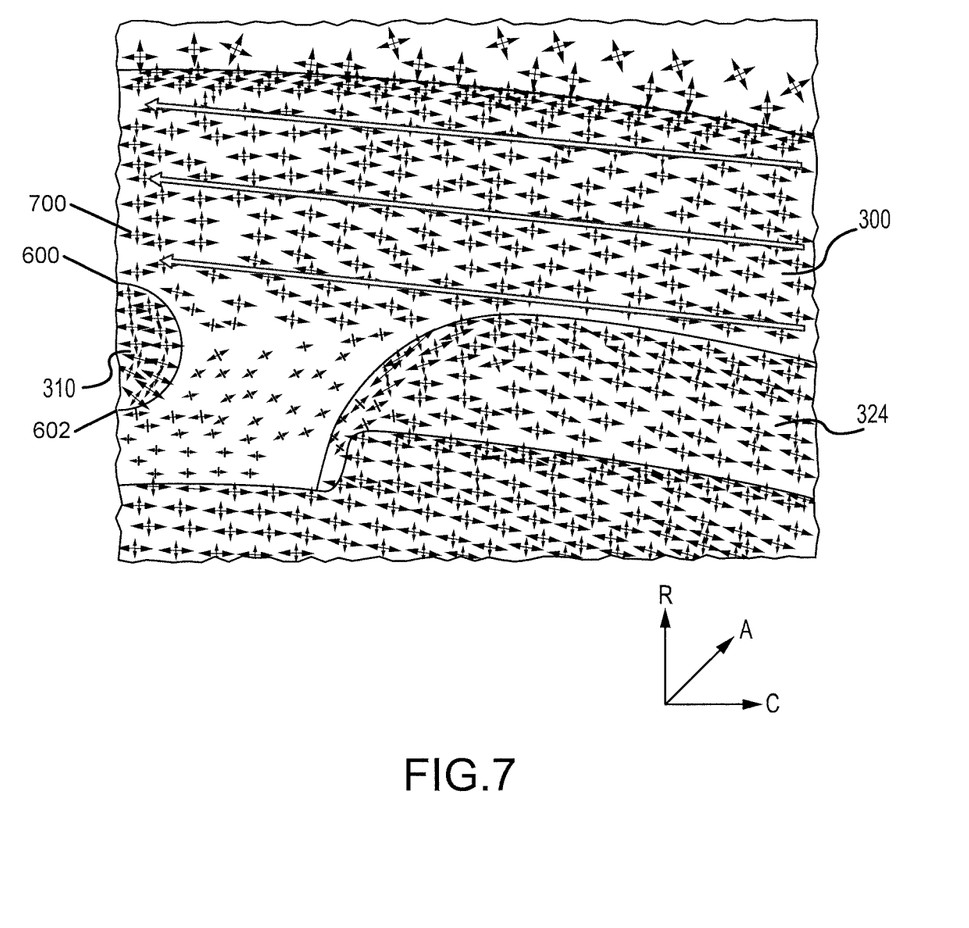
FIG. 7 is a diagram illustrating the magnitude and direction of physical stresses experienced by a hubcap attachment flange of the outboard wheel half of FIG. 3, in accordance with various embodiments.

Turning to FIG. 7, a diagram illustrates physical stress experienced in various portions of hubcap attachment flange 300. In particular, arrows 700 illustrate directions and magnitudes of physical stress experienced at the various locations and the direction in which the physical stress is experienced. As shown in FIG. 7, much of the stress that would be experienced by second alignment hole 310 is diverted radially outward of second alignment hole 310 by second pocket 324.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An outboard wheel half having an axis, comprising:
   an outboard wheel structure configured to receive at least a portion of a tire; and
   a flange of the outboard wheel structure defining an alignment hole usable to align a hubcap relative to the flange and defining a pocket circumferentially aligned with the alignment hole, wherein the flange defines a radially outer portion of the pocket, wherein the flange defines an axially outer edge of the pocket, wherein the flange defines an axially inner edge of the pocket, and wherein the pocket is defined by a concave surface of the flange, the concave surface extending from the axially outer edge radially, circumferentially, and axially to the axially inner edge; wherein the flange comprises a hubcap attachment flange that includes a first ring retaining tab and a second ring retaining tab such that the pocket is positioned circumferentially between the first ring retaining tab and the second ring retaining tab;

wherein the outboard wheel half further comprises a bearing retaining ring, wherein the first ring retaining tab or the second ring retaining tab axially overlaps and therefore resists movement of the bearing retaining ring relative to the outboard wheel half during installation of the outboard wheel half on an aircraft axle.

2. The outboard wheel half of claim 1, wherein the flange further defines a plurality of pockets that includes the pocket, the plurality of pockets being circumferentially positioned about the outboard wheel structure.

3. The outboard wheel half of claim 2, wherein the plurality of pockets are spaced equidistant about a circumference of the outboard wheel structure.

4. The outboard wheel half of claim 1, wherein the alignment hole is positioned circumferentially between the pocket and a second pocket.

5. The outboard wheel half of claim 1, wherein the outboard wheel half is configured to mate with an inboard wheel half to form a wheel assembly for use with landing gear of an aircraft.

6. The outboard wheel half of claim 1, wherein the alignment hole is defined by one of the first ring retaining tab or the second ring retaining tab.

7. The outboard wheel half of claim 1, wherein a ratio of a circumferential distance of the pocket to a circumferential distance of the first ring retaining tab or the second ring retaining tab is between 2:1 and 8:1.

8. A wheel assembly for using in landing gear of an aircraft, comprising:
a wheel structure configured to receive at least a portion of a tire; and
a flange of the wheel structure defining an alignment hole usable to align a hubcap relative to the flange and defining a pocket circumferentially aligned with the alignment hole, wherein the flange defines a radially outer portion of the pocket, wherein the flange defines an axially outer edge of the pocket, wherein the flange defines an axially inner edge of the pocket, and wherein the pocket is defined by a concave surface of the flange, the concave surface extending from the axially outer edge radially, circumferentially, and axially to the axially inner edge; wherein the flange comprises a hubcap attachment flange that includes a first ring retaining tab and a second ring retaining tab such that the pocket is positioned circumferentially between the first ring retaining tab and the second ring retaining tab;
wherein the wheel structure further comprises a bearing retaining ring, wherein the first ring retaining tab or the second ring retaining tab axially overlaps and therefore resists movement of the bearing retaining ring relative to the wheel assembly during installation of the wheel assembly on an aircraft axle.

9. The wheel assembly of claim 8, wherein the flange includes a plurality of pockets that includes the pocket, the plurality of pockets being circumferentially positioned about the wheel structure.

10. The wheel assembly of claim 9, wherein the plurality of pockets are spaced equidistant about a circumference of the flange.

11. The wheel assembly of claim 8, wherein the alignment hole is positioned circumferentially between the pocket and a second pocket.

12. The wheel assembly of claim 8, wherein the alignment hole is defined by one of the first ring retaining tab or the second ring retaining tab.

13. The wheel assembly of claim 8, wherein a ratio of a circumferential distance of the pocket to a circumferential distance of the first ring retaining tab or the second ring retaining tab is between 2:1 and 8:1.

14. A wheeled vehicle comprising:
a first wheel assembly; and
a second wheel assembly having:
a wheel structure configured to receive at least a portion of a tire, and
a hubcap attachment flange defining an alignment hole usable to align a hubcap relative to the hubcap attachment flange and defining a pocket circumferentially aligned with the alignment hole, wherein the hubcap attachment flange defines a radially outer portion of the pocket, wherein the hubcap attachment flange defines an axially outer edge of the pocket, wherein the hubcap attachment flange defines an axially inner edge of the pocket, and wherein the pocket is defined by a concave surface of the hubcap attachment flange, the concave surface extending from the axially outer edge radially, circumferentially, and axially to the axially inner edge; wherein the wheeled vehicle further comprises a bearing retaining ring and an aircraft axle, wherein the hubcap attachment flange includes a first ring retaining tab and a second ring retaining tab such that the pocket is positioned circumferentially between the first ring retaining tab and the second ring retaining tab, wherein the first ring retaining tab or the second ring retaining tab axially overlaps and therefore resists movement of the bearing retaining ring relative to the second wheel assembly during installation of the second wheel assembly on the aircraft axle.

15. The wheeled vehicle of claim 14, wherein a ratio of a circumferential distance of the pocket to a circumferential distance of the first ring retaining tab or the second ring retaining tab is between 2:1 and 8:1.

* * * * *